JOHN REBMAN.
Improvement in Cultivators.
No. 126,412. Patented May 7, 1872.
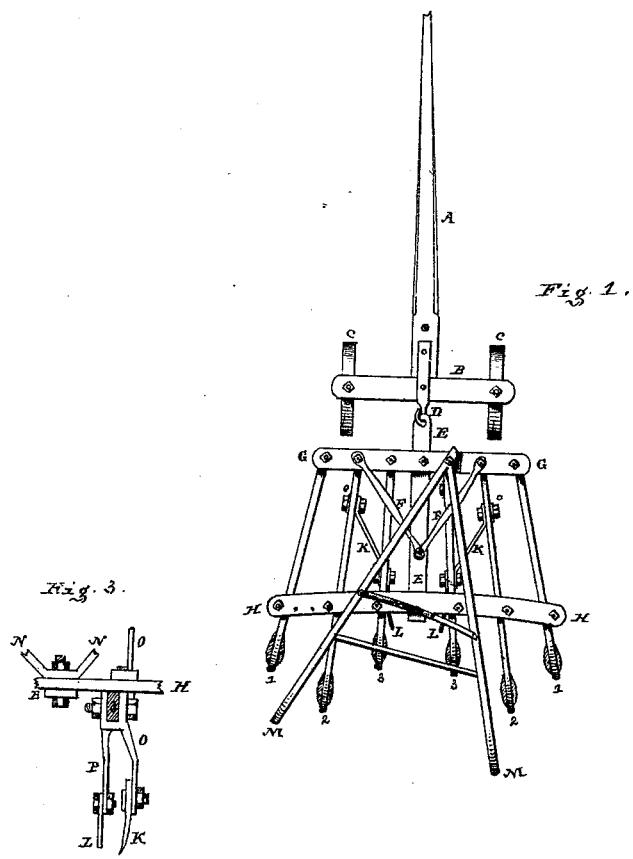
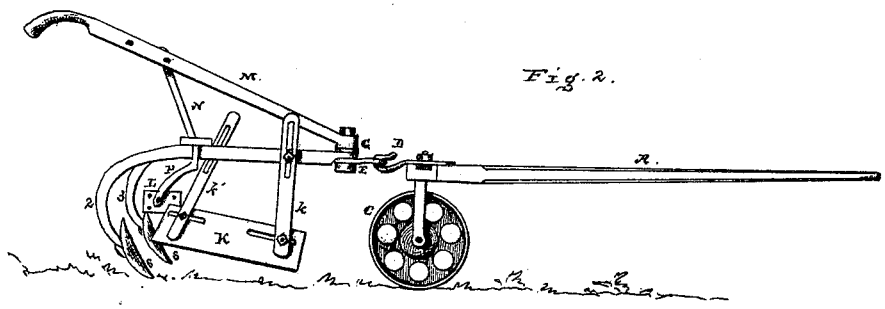
Witnesses.
Henry C. Stauffer.
John Bender
Inventor.
John Rebman
per J. Stauffer Att.

UNITED STATES PATENT OFFICE.

JOHN REBMAN, OF MANHEIM TOWNSHIP, PENNSYLVANIA.

IMPROVEMENT IN CULTIVATORS.

Specification forming part of Letters Patent No. 126,412, dated May 7, 1872.

Specification describing certain Improvements in Cultivators, invented by JOHN REBMAN, of Manheim township, in the county of Lancaster and State of Pennsylvania.

The invention relates to the application of a protecting board or plate to prevent clogs of soil from breaking down or covering young corn while working it, as well as in the arrangement of scrapers made adjustable vertically and laterally, together with a two-wheeled hinged truck attachment, to relieve the drag on the horse and make the cultivator more easily managed in lateral movements, all arranged on that class of cultivators having wrought-iron adjustable beams, curved at the ends for the reception of the shovels.

Figure 1 is a top or plan view of the combined truck and cultivator; Fig. 2, a side elevation of the same, with the outer beam removed; Fig. 3, a rear elevation in part, to show the connection of the parts P O to the central beam 3 of the one side.

The manner of hinging the beams in front and adjusting them with the supporting hook-bolts and nuts is the same as in my patent No. 109,247, dated November 15, 1870, only that, in order to perform double work, in the present application I employ six beams, numbered from the outer one on both sides, 1, 2, and 3. These are hinged between the front cross-pieces G, and made adjustable in the slightly-curved cross-piece H in the rear. The beams 2 2 extend further back than the beams 1 3 1 3, each of which is curved down in the ordinary manner, and has the reversible shovel centrally attached by a headed bolt and nut, as in my former three-beamed cultivator, and thus far claim no novelty. In order to brace the parts I have a center-bar, E, which projects in front, and has an eye for the hook-connection D on the cross-piece B to the pole A, and with the wheels C forms the truck. To this center-piece E are attached the braces F at one end, extending outward and forward to the cross-piece G, and secured by the bolts, on which the beams 2 2 are hinged. The wooden handles M M are fastened in the said cross-piece G with the bolt for the central beam 3 on one side, and braced by N N, held by the bolt that secures the center-piece E, under the rear cross-piece H. The scrapers K have longitudinal slots, and are supported by holders $k$, slotted vertically, thus allowing of a wide lateral and vertical adjustment of the scrapers, which stand in the usual oblique position, by having the rear end attached to the beams 3 3, and carried outward in front to beams 2 2, in which the binding or set screws are severally secured through the slotted supports. The protecting boards or plates L are made adjustable by means of perforations for the headed bolts to the supporting-pieces P P. These latter are bolted above, on the inner side of the two central beams 3 3, with the same bolts that hold the rear scraper-supports $k'$. The use of the protecting-plates L is to prevent heavy or large clogs of soil from rolling upon the young corn, while the finely-pulverized soil passes beneath them and flows around the base of the corn, thus saving the labor of erecting the same; this, I am aware, is not new, but applied substantially in a different manner, and less satisfactory in the results. This is true, also, of the scrapers, as they are common, but differ substantially, as in this case they need not be removed, but simply slipped up.

I am not aware that scrapers or protectors have ever been so arranged as here shown and described, in combination with the beams made and arranged substantially as set forth.

Having experienced the difficulty of managing a two-row cultivator, when supported by pulley-wheels, single or in pairs, which were connected with the cultivator, I have provided the pole A with a cross-piece, B, to which the wheels C are attached, forming a wheeled support or independent truck and guiding-carriage, which is attached to the cultivator by means of the hook-plate D to the central piece E of the cultivator, which has an eye, thus forming a pivot or universal-joint connection, which, while it relieves the horses of a dead drag, greatly facilitates the handling of the cultivator under various circumstances arising from inequality of the soil, or in turning at the ends of the row, the whole forming a valuable and desirable combination.

What I claim as my invention on a double- row cultivator, having six iron beams, connected as herein described, and desire to secure by Letters Patent, is—

In a cultivator, I claim the combination of the devices used, consisting of the detachable truck A B C, beams 1, 2, and 3, central plate E, scrapers K, and protecting-plates L, all arranged and made adjustable in the manner and for the purpose specified.

JOHN REBMAN.

Witnesses:
WM. B. WILEY,
JACOB STAUFFER.